[United States Patent Office — 3,522,191 — Patented July 28, 1970]

3,522,191
LUMINOPHORS AND METHOD
Warren H. Turner, Toledo, Ohio, and Marvin J. Albinak, Wheeling, W. Va., assignors to Owens-Illinois, Inc., a corporation of Ohio
No Drawing. Filed Dec. 21, 1966, Ser. No. 603,413
Int. Cl. C03c 3/28; C09k 1/36, 1/66
U.S. Cl. 252—301.6                                  8 Claims

ABSTRACT OF THE DISCLOSURE

Luminescent glasses are provided wherein divalent europium is present in solution in the glassy phase along with substantial amounts of $B_2O_3$ and/or $P_2O_5$, in which valence state the europium emits a bright blue-to-green output.

---

This invention relates to luminescent glass compositions and, more particularly, to photoluminescent glass compositions containing europium and wherein the normally bright red output of $Eu^{3+}$ (in glass) is shifted to bright blue-to-green output which is brighter than the familiar yellow-area fluorescence of uranium under comparable conditions.

Further, the invention relates to photoluminescent glasses that are characterized by suitability for visual use, and having very good physical properties rendering them capable of incorporation into many useful objects.

THE PRESENT INVENTION

We have discovered that a very bright blue-to-green luminescence (brighter than the familiar yellow-green fluorescence of uranium under comparable conditions) is obtained with relatively low amounts of divalent europium, in borate and phosphate glasses, but also in silicate glasses containing $B_2O_3$ and/or $P_2O_5$.

The valence state is readily attained in alkali-free glasses and may be attained in alkali-containing glasses by reduction, thermal dissociation, or other means.

THE PROBLEM

As indicated above, $Eu^{3+}$ provides a strong red luminescent output. This output, however, is not useable for many applications. It is often desirable to have an output color in the blue-to-green range which is at the other end of the spectrum, which $Eu^{3+}$ will not provide. By the present invention, using $Eu^{2+}$ in $B_2O_3$ and $P_2O_5$ containing glasses, very bright blue-to-green outputs are unexpectedly provided.

Although many of the prior phosphors are satisfactory for some uses, they are often unsatisfactory for visual use. Further, they are costly. Thus, the phosphors are sensitive to impurities. Minute amounts of impurities cause the photoluminescence of phosphors to be substantially reduced. As a result, they are expensive to produce because of the care and precision required during their manufacture to both remove impurities and to keep impurities out. Further, they lack durability under use conditions, etc.

The objects of the present invention, therefore, are to produce novel photoluminescence glasses having improved color output, greater brightness and other improved charactertics as will become apparent from the following description.

THE INVENTION—BROAD ASPECTS

The glasses made in accordance with the present invention are characterized by a high level of photoluminescence. In the invention, europium is used as the luminescent activator in the reduced state, $Eu^{2+}$.

The rare earth elements have been used heretofore in the preparation of luminescent material. In the prior art, these have been used as activators; that is, they have been used as intentionally added impurity materials. In the present invention, they are used in the same manner and in minute quantities, but in a substantial range of quantities.

Optimum luminescent properties are obtained in the present invention with proportions of activating material on the order of about .01 to 1.0 parts per 100 parts of glass. This range is illustrative and is not to be considered limiting on the invention.

It is not intended to restrict the invention to any means of reducing europium, but simply to cover compositions containing sufficient $Eu^{2+}$ to give the bright blue-to-green luminescence.

The following factors characterize the invention:

(1) The present invention is operable in a broad spectrum of glasses, albeit a selected spectrum of glasses in as much as all are not operable in accordance with the principles of this invention;

(2) Europium is present in the novel luminescent media of the present invention in reduced form, i.e., the $Eu^{2+}$ state.

It is unique to each of the glasses of this invention that the presence, particularly of $B_2O_3$ and/or $P_2O_5$ components, serves to shift the normally red output color of trivalent europium luminescent activator over to the blue-to-green, typical of divalent europium. This is readily effected by melting the glass under reducing conditions, in the presence of substantial amounts of $B_2O_3$ and/or $P_2O_5$. In some higher melting glasses, thermal dissociation of $Eu_2O_3$ to EuO is sufficient to produce the results of the invention.

Thus, in accordance with this invention, there is prepared a photoluminescent glass having in solution therein at least one member selected from $B_2O_3$ and $P_2O_5$ and a small effective amount of divalent europium, e.g. usually about .01 to 1 percent by weight based on the total weight of the glass.

Typically, the glass contains about 5 to 70 weight percent of $B_2O_3$ and/or 5 to 80 weight percent of $P_2O_5$.

The amount of $SiO_2$, $Al_2O_3$ and/or other constituents incorporated in the glass is determined by the desired physical properties of the glass. The limits, in general, are set by the devitrification levels.

The following examples typify glasses made in accordance with this invention. Further ramifications will become apparent to those skilled in the art, within the scope of the invention.

The various ramifications of the invention can be broken down into categories, based upon the content of either $B_2O_3$ and/or $P_2O_5$, whichever seems to be predominant in the glass. The following discussion will highlight the various aspects and extended scope of the invention.

The results are based, generally, on raw data and there is only a rough correlation from one glass to another, due to variables inherent in glass preparation and testing. However, the important trends are apparent.

Example I—Borate glasses

The base glasses used in this series of runs were borate glasses of the following final oxide compositions:

| Glass Number: | Components | Parts by weight |
|---|---|---|
| I-1 | $B_2O_3$ | 55.25 |
|  | CaO | 29.66 |
|  | $Al_2O_3$ | 14.99 |
|  | $Eu_2O_3$ | (1) |
| I-2 | $B_2O_3$ | 32.03 |
|  | ZnO | 56.15 |
|  | $Al_2O_3$ | 11.72 |
|  | $Eu_2O_3$ | (1) |

[1] As listed.

Varying amounts of europium oxide were added to the base glasses. Additionally, in some of the runs varying amounts of cerium oxide and terbium oxide luminescent activator agents were utilized. Luminescent output results are shown in the following table:

| Glass Number | Parts $Eu_2O_3$ | Other | Color—Redox Conditions |
|---|---|---|---|
| I-1 | 0.1 | | Moderate blue, white—Neutral. |
| I-2 | 0.04 | .06 $Tb_1O_3$ | Red—Neutral. |
| I-2 | 0.10 | .06 $Tb_1O_3$ | Orange, yellow—Neutral. |
| I-1 | 0.04 | .06 $Tb_1O_3$ | Red—Neutral. |
| I-1 | 0.23 | .02 $CeO_1$ | Purple—Neutral. |
| I-1 | 0.10 | .02 $CeO_1$ | Do. |

Comments: Either blue-green luminescence, characteristic of $Eu^{2+}$, or red luminescence characteristic of $Eu^{3+}$, may be obtained. However, low concentrations and reducing conditions result in a predominance of $Eu^{2+}$ in accordance with the invention.

Example II—Phosphate glasses

Several phosphate glasses were used in this series of runs. The glasses were of the following final oxide compositions:

| Glass Number: | Components | Parts by weight |
|---|---|---|
| II-1 | $P_2O_5$ | 70.83 |
|  | $Al_2O_3$ | 7.69 |
|  | CaO | 21.38 |
|  | Eu | (1) |
| II-2 | $P_2O_5$ | 67.53 |
|  | $Al_2O_3$ | 5.00 |
|  | SrO | 27.37 |
|  | Eu | (1) |
| II-3 | $P_2O_5$ | 69.68 |
|  | $R_2O$ (Na) | 30.22 |
|  | Eu | (1) |
| II-4 | $P_2O_5$ | 82.52 |
|  | $R_2O$ (Li) | 17.48 |
|  | Eu | (1) |
| II-5 | $P_2O_5$ | 60.19 |
|  | $R_2O$(K) | 39.71 |
|  | Eu | (1) |
| II-6 | $P_2O_5$ | 70.83 |
|  | $Al_2O_3$ | 7.69 |
|  | MgO | 21.38 |
|  | Eu | (1) |

[1] As listed.

Varying amounts of europium oxide were added to the glasses. Additionally, in some of the glasses, varying amounts of terbium oxide luminescent activator were used. The glasses were melted under reducing conditions. Luminescent output results are shown in the following table:

| Glass Number | Parts $Eu_2O_3$ | Other | Color—Redox Conditions |
|---|---|---|---|
| II-1 | .05 | .05 $Tb_2O_3$ | Red-pink—Reduced. |
| II-1 | .10 | .20 $Tb_2O_3$ | Do. |
| II-1 | .10 | | Pink—Reduced. |
| II-2 | .10 | | Pink-blue—Reduced. |
| II-3 | .10 | | Red—Neutral. |
| II-4 | .10 | | Do. |
| II-5 | .10 | | Pink—Neutral. |
| II-6 | .10 | | Bright blue—Reduced. |

Reducing conditions used were insufficient in most of these glasses; only the high melting glass (II-6) shows the bright luminescence characteristic of divalent $Eu^{2+}$, due to adequate reducing conditions and thermal decomposition.

Example III

Several silicate glasses were used in this series of runs. Varying amounts of europium oxide were added to the glasses. Additionally, in some of the glasses, varying amounts of terbium oxide luminescent activators were used.

| Glass Number | Parts $Eu_2O_3$ | Other | Designation | Color—Redox Conditions |
|---|---|---|---|---|
| 25 | 0.05 | | Mg-Al-$SiO_2$* | Moderate blue—In air. |
| 26 | 0.05 | | Soda lime | Nil—Reduced. |
| 27 | 0.05 | | do | Nil—Oxidized. |
| 28 | 1.0 | | Soda, zinc / Aluminosilicate | Red—Reduced. |
| 29 | 0.25 | | Barium crown | Orange—Neutral. |
| 30 | 1.00 | | do | Red—Neutral. |
| 31 | 0.25 | | Mg-Al-$SiO_2$ | Red—In Air. |
| 32 | 0.25 | | Mg-Al-$SiO_2$ | Nil—Reduced. |
| 33 | 0.25 | | Li-Mg-Al-$SiO_2$ | Red—In Air. |
| 34 | 0.23 | 0.02 $CeO_2$ | Mg-Al-$SiO_2$ | Nil—In Air. |
| 35 | 0.25 | | Soda lime | Red—Oxidized. |
| 36 | 0.25 | | do | Red—Reduced. |
| 37 | 0.01 | | do | Greenish. |
| 38 | 0.25 | | do | Red—Reduced. |
| 39 | 0.25 | | Zinc crown | Red—In Air. |
| 40 | 0.01 | | Soda-lime—Reduced | Yellow—Reduced. |
| 41 | 0.05 | 0.45 Sn | Sr-Al-$SiO_2$ | Nil—Reduced. |
| 42 | 0.10 | | Li-Al-$SiO_2$ | Yellow. |
| 43 | 0.10 | | Na-Al-$SiO_2$ | Do. |

* MgO, 20.5; $Al_2O_3$, 18.5; $SiO_2$, remainder.

Comments: Low concentrations and reducing conditions may result in $Eu^{2+}$. However, no especially bright $Eu^{2+}$ luminescence is observed in any of the above glasses. Several glasses show evidence of both $Eu^{2+}$ and $Eu^{3+}$ oxidation states, as evidenced by the yellow luminescence.

It can, therefore, be concluded that these silicate glasses do not display the unique effects provided by the phosphate and borate glasses, of shifting the normal red europium output over to the very bright blue-to-green output.

Example IV.—Borosilicates

The base glass used in this series of runs was a borosilicate glass of the following final oxide composition:

| Components: | Parts by wt. |
|---|---|
| $SiO_2$ | 76.17 |
| $Al_2O_3$ | 1.99 |
| $B_2O_3$ | 15.26 |
| $Na_2O$ | 6.33 |

Varying amounts of europium oxide were added to the base glass. Additionally, in some instances, varying amounts of cerium oxide and terbium oxide luminescent activators were utilized. Luminescent output results are shown in the following table:

| Parts $Eu_2O_3$ | Other | Color—Redox Conditions |
|---|---|---|
| 0.25 | | Bright blue—Reduced. |
| 0.24 | 0.01 $CeO_2$ | Do. |
| 0.25 | | Bright purple—Neutral. |
| 0.23 | 0.02 $CeO_2$ | Do. |
| 0.95 | 0.05 $CeO_2$ | Red—Neutral. |
| 0.08 | 0.12 $Tb_2O_3$ | Orange—Neutral. |

Comments: Either blue-green luminescence, characteristic of $Eu^{2+}$, or red luminescence characteristic of $Eu^{3+}$, may be obtained. However, low concentrations and reducing conditions unexpectedly result in a predominance of $Eu^{2+}$, and a much brighter than expected emission.

Example V.—Silica-phosphate-borate compositions; mixed glass composition

The base glass used in this series of runs was a silica-phosphate-borate glass of the following final oxide composition:

| Components: | Parts by wt. |
|---|---|
| $SiO_2$ | 50.71 |
| $Al_2O_3$ | 17.66 |
| CaO | 6.32 |
| MgO | 5.52 |
| $B_2O_3$ | 9.00 |
| $P_2O_5$ | 10.71 |
| $Eu_2O_3$ | 0.8 |

Varying amounts of europium oxide were added to the base glass. Additionally, in some of the glasses varying amounts of terbium oxide and tin oxide luminescent activator were utilized. Luminescent output results are shown in the following table:

| Parts $Eu_2O_3$ | Other | Color—Redox Conditions |
|---|---|---|
| 0.08 | 0.12 $Tb_2O_3$ | Very bright blue—Reduced. |
|  | 0.08 $Tb_2O_3$ | Do. |
| 0.08 | 0.50 SnO | Bright blue—Reduced. |
| 0.10 |  | Bright purple—Reduced. |

Comments: The very bright blue-green luminescence, characteristic of $Eu^{2+}$ is obtained by using low concentrations and reducing conditions, resulting in a predominance of $Eu^{2+}$.

From the foregoing it can be concluded that the invention is, therefore, selective to europium ($Eu^{2+}$) in glass systems having in combination therein $B_2O_3$ and/or $P_2O_5$. Further, it will be observed that the brighter glasses are the higher melting materials containing $SiO_2$, $Al_2O_3$ and preferably the alkaline earth metal oxides.

Typical compositions are broadly listed as follows:
(1) Phosphate glasses:
   (a) Ca-Al-phosphate
   (b) Mg-Al-phosphate
   (c) Sr-Al-phosphate
   (d) Zn-Al-phosphate
(2) Borate glasses:
   (a) Calcium aluminoborate
   (b) Zinc aluminoborate
   (c) Commercial borosilicate compositions as follows:
      (1) Borosilicate—low expansion:
         $SiO_2$—80.5; $Na_2O$—3.8; $K_2O$—0.4; $B_2O_3$—12.9; and, $Al_2O_3$—2.2.
      (2) Borosilicate—tungsten sealing:
         $SiO_2$—67.3; $Na_2O$—4.6; $K_2O$—1.0; MgO—0.2; $B_2O_3$—24.6; and, $Al_2O_3$—1.7.

SUMMARY

The improvements provided by the glasses of the present invention include the following:

(1) Strong brilliant luminescence by europium $Eu^{2+}$ in a broad spectrum of glasses, containing either $B_2O_3$ and/or $P_2O_5$, wherein the normal red output is shifted over to blue-to-green output;

(2) An important advantage of these products is their transparency;

(3) Improved maintenance factor by virtue of the fact that the glasses provide better resistance to deterioration; and, (4) Blue-to-green luminescence, typified by $Eu^{2+}$, in these particular glasses.

A unique contribution to the prior art is provided by the present invention, making it possible to produce fluorescent lighting tubes, luminous markers, signs, dials and many other devices having a brighter spectral output for visual use.

In accordance with the present invention, a substantial advance has been provided to the art by over-coming problems relating to phosphors. In accordance with the invention, transparent, luminescent glass materials are provided. These are particularly adapted for use as targets in a broad range of devices to produce luminescent emissions from excitation energy such as photon radiation, exemplified by ultraviolet rays or the like.

A further advantage provided by the present invention is the improved workability of the luminescent products. Thus, the invention provides better workability in silicate-based glass compositions that are luminescent.

Within the scope of the invention, luminescent device means any apparatus in which energizing radiation is converted into luminescent emissions. Photoluminescent device refers to any luminescent device in which the energizing agent is photon radiation.

What is claimed is:

1. A photoluminescent glass which consists essentially of:

| Component: | Parts by wt. |
|---|---|
| $B_2O_3$ | 55.25 |
| CaO | 29.66 |
| $Al_2O_3$ | 14.99 |
| $Eu^{2+}$ | .04–0.1 |

2. A photoluminescent glass which consists essentially of:

| Component: | Parts by wt. |
|---|---|
| $B_2O_3$ | 32.03 |
| ZnO | 56.15 |
| $Al_2O_3$ | 11.72 |
| $Eu^{2+}$ | .04–0.23 |

3. A photoluminescent glass which consists essentially of:

| Component: | Parts by wt. |
|---|---|
| $SiO_2$ | 76.17 |
| $Al_2O_3$ | 1.99 |
| $B_2O_3$ | 15.26 |
| $Na_2O$ | 6.33 |
| $Eu^{2+}$ | .08–0.95 |

4. A photoluminescent glass composition consisting essentially of the following components in solution in the glassy phase:

| Component: | Parts by wt. |
|---|---|
| $SiO_2$ | 50.71 |
| $Al_2O_3$ | 17.66 |
| CaO | 6.32 |
| MgO | 5.52 |
| $B_2O_3$ | 9.00 |
| $P_2O_5$ | 10.71 | and containing $Eu^{2+}$ in sufficient amount to make the glass composition luminescent.

5. The invention according to claim 4 wherein there is present .08 parts by weight of $Eu^{2+}$.

6. A photoluminescent glass which consists essentially of:

| Component: | Parts by wt. |
|---|---|
| $P_2O_5$ | 70.83 |
| $Al_2O_3$ | 7.69 |
| CaO | 21.38 |
| $Eu^{2+}$ | .05–0.10 |

7. A photoluminescent glass which consists essentially of:

| Component: | Parts by wt. |
|---|---|
| $P_2O_5$ | 67.53 |
| $Al_2O_3$ | 5.00 |
| SrO | 27.37 |
| $Eu^{2+}$ | 0.10 |

8. A photoluminescent glass which consists essentially of:

| Component: | Parts by wt. |
|---|---|
| $P_2O_5$ | 70.83 |
| $Al_2O_3$ | 7.69 |
| MgO | 21.38 |
| $Eu^{2+}$ | 0.10 |

References Cited

UNITED STATES PATENTS 2,049,765  8/1936  Fischer _____ 252—301.4

OTHER REFERENCES

Pringsheim, Fluorescence and Phosphorescence, 1949, pp. 478–479.

TOBIAS E. LEVOW, Primary Examiner

R. D. EDMONDS, Assistant Examiner

U.S. Cl. X.R.

106—47, 54; 252—301.4